Oct. 13, 1931.  C. BECKER  1,827,133
MACHINE FOR CUTTING AND PANNING BISCUITS
Filed April 22, 1930  2 Sheets-Sheet 1
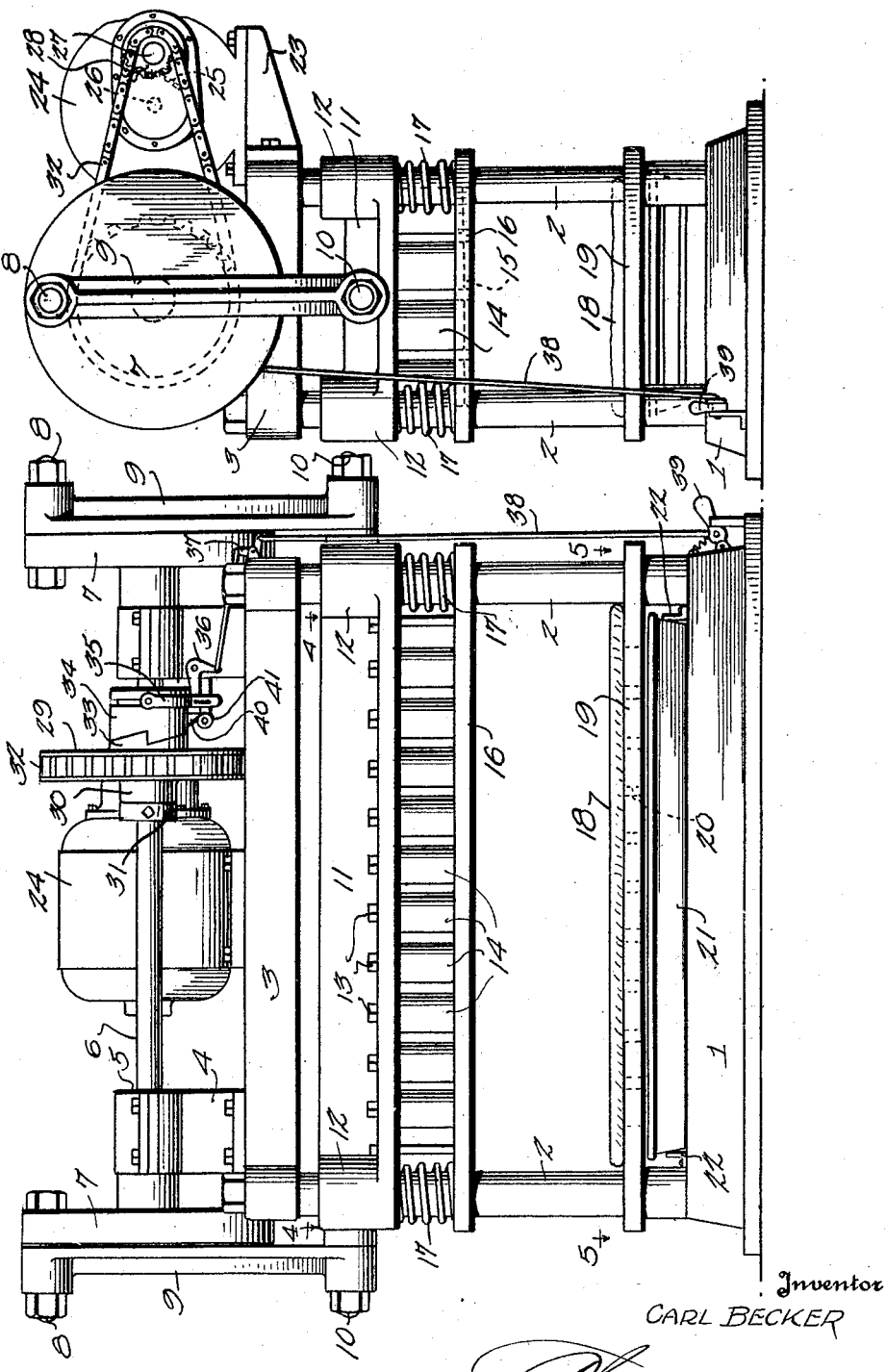
Inventor
CARL BECKER Oct. 13, 1931.   C. BECKER   1,827,133
MACHINE FOR CUTTING AND PANNING BISCUITS
Filed April 22, 1930   2 Sheets-Sheet 2
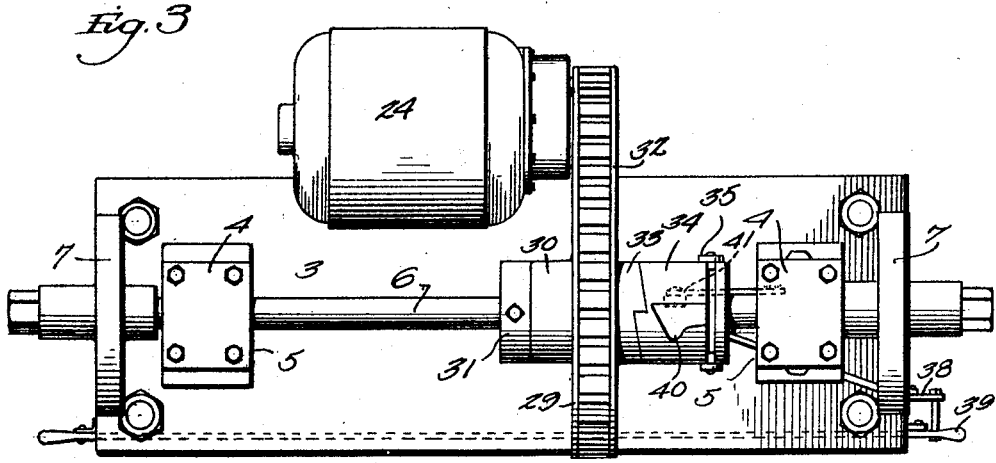
Fig. 3
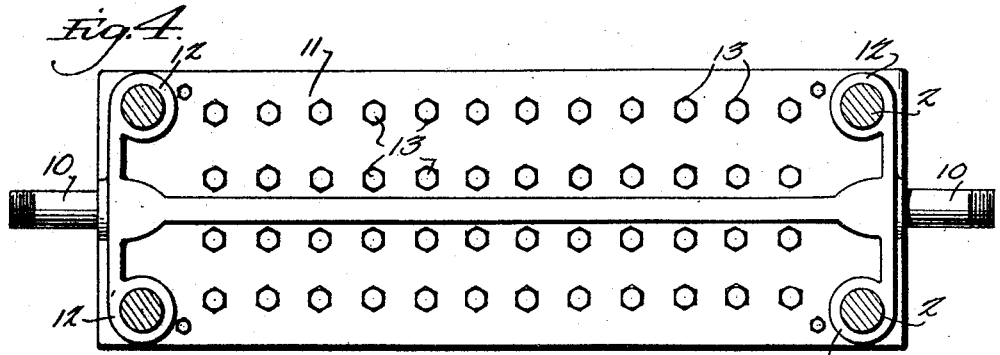
Fig. 4
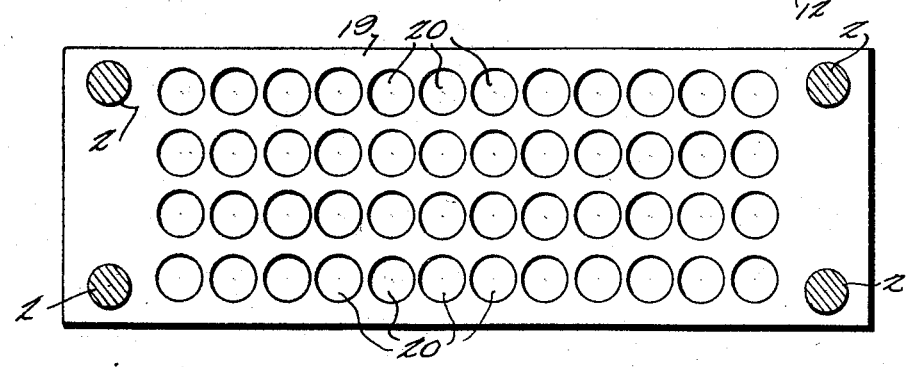
Fig. 5
Inventor
CARL BECKER
By
Attorney Patented Oct. 13, 1931

1,827,133

UNITED STATES PATENT OFFICE

CARL BECKER, OF NASHVILLE, TENNESSEE, ASSIGNOR OF FIFTEEN PER CENT TO ROBERT E. GARRETT, OF NASHVILLE, TENNESSEE

MACHINE FOR CUTTING AND PANNING BISCUITS

Application filed April 22, 1930. Serial No. 446,372.

My invention is an improved machine for cutting and panning biscuits, that is to say, a machine which performs the manifold operation of first cutting the biscuit, cracker, or cake, and then delivering it to the pan which is placed in the oven for baking.

One object of my invention is the provision of a machine which will rapidly cut and deliver a large number of biscuits and which will require only a single attendant to operate and control the machine, thus making its use highly desirable because inexpensive to operate and control.

Another object of my invention is the provision of a machine of this character in which all of the driving or power mechanism is located above the cutting mechanism, in order that said mechanism may be easy of access, free of danger to the operator and where foreign matter will not be liable to accumulate were such mechanism near the floor.

Another object of my invention is the provision of a machine which will comprise few working parts and will thus not be likely to get out of order and which will be capable of withstanding the hard service or usage to which such a machine would naturally be subjected.

Another object of my invention is the production of a machine which will be under the control and operation of a single attendant and which will cut and deliver the biscuits at a single operation and will automatically return to normal position for a following operation, thus making the operation and control of the machine automatic and easy of control.

Another object of my invention is the provision of a machine which will be comparatively small and compact in size to occupy a small amount of space while having a large producing capacity, which will be of strong and durable construction and capable of manufacture at a fair price, thus insuring a machine which will be useful, efficient and practical in every particular.

With these and such other objects in view as inhere to an invention of this character, my invention consists of a machine for cutting and panning biscuits embodying novel features of construction and combination of parts, substantially as described and claimed and as shown in the accompanying drawings, in which:

Figure 1 represents a side elevation of a machine for cutting and panning biscuits constructed in accordance with and embodying my invention.

Figure 2 represents an end view or elevation of my machine.

Figure 3 represents a top plan view.

Figure 4 represents a sectional view taken on line 4—4 of Figure 1, and

Figure 5 represents a sectional view taken on line 5—5 of Figure 1.

Referring by numeral to the drawings, in which the same numbers of reference are employed to denote like parts in all the views:

The numeral 1 designates the bed or base of the machine, from which at the corners rise the four cylindrical posts or columns 2, and supported upon said posts or columns is the plate 3, which serves to support the pair of pillow blocks 4, which have journaled in the bearings 5 thereof, the shaft 6, upon the ends of which are mounted the pair of disks 7, and to the pins 8 disposed near the edge of said disks are pivoted the upper ends of the pair of links 9, whose lower ends are pivoted to the pins or studs 10, which extend outwardly from the rectangular shaped follower 11, which is provided with vertical sleeves 12, at its corners which encircle the four columns or posts 2, which serve to guide said follower in its vertical movement by reason of the rotation of the shaft and disks which naturally through the medium of the links 9 imparts a rising and falling movement to said follower.

From this construction it will be understood that rotation of the shaft and disks carried thereby through the link connection with the follower moves said follower up and down and secured to the underface of the follower by means of fastenings 13, are the biscuit cutters 14, and these are adapted in their vertical movement to be guided in and passed through the openings 15, in the plate 16, which is adapted to move with said follower and upon the posts between said follower and plate are disposed the cushioning springs 17, which when the follower is at its lowest point are compressed to allow the cutters to pass through the openings 15 and thence cut the biscuit from the sheet or layer of dough 18, which rests upon the plate 19, and the effect of which is to force the dough in the form of biscuit through the openings 20 of the plate 19, into the receiving pan 21, which rests upon the bed plate of the machine and is held in proper position by means of the cleats 22.

From this construction it will be apparent that the follower is carried down and the cutters pass through the dough which is delivered through the openings of the plate above the receiving pan and discharged in perfect form into said receiving pan and to provide for the rotation of the shaft and its proper control I provide the mechanism which I will now describe.

Disposed upon an extension or bracket 23 of the mechanism supporting plate is a motor 24, which is preferably a small electrically operated motor, and through suitable gearing 25, operated from the motor shaft 26, the shaft 27, is rotated which carries the small sprocket wheel 28, over which an enlarged sprocket wheel 29, which has its hub 30 mounted upon the main shaft of the machine, and retained in proper position by the collar 31, passes the sprocket chain 32, and from this construction it will be observed that the sprocket wheel through its connection with the shaft of the driving motor rotates free until the clutch collar 33, upon the outer face of said sprocket wheel is brought into engagement with the sliding clutch collar 34, by means of the yoke 35, the lever 36, the bell crank lever 37, and the connection 38, with the hand-operated lever 39, operates to slide said collar 34 into engagement with collar 33, which causes the sprocket wheel to rotate the shaft and with it the disks which actuate the links and raise the follower with its cutters up and down to effect the cutting and delivery of the biscuits and the return of the follower for another operation.

It will thus be seen that while normally the sprocket wheel rotates idly or free upon the driving shaft and when desired to throw the mechanism into operation the finger lever is depressed which through the connections described shifts the sliding clutch collar into engagement with the rigid clutch collar on the large driving sprocket wheel, the effect of which is to lower the follower with cutters, which then cuts and delivers the biscuits and returns vertically to near its uppermost vertical position, at which time the cam 40 on the sliding clutch collar 34, engages the lever or abutment 41, the effect of which is to withdraw said sliding collar from engagement with the clutch collar 33 and to permit the shaft to rotate free in its bearings and the machine to remain at rest while another batch of dough and a pan are inserted to prepare for the repetition of the operation of cutting and delivering the finished biscuits.

The operation of the clutch mechanism will be readily understood from Figures 1 and 3 of the drawings, and the clutch is of the well known sliding type which when the yoke 35 is tilted through the hand lever and connections the clutch collar is slid upon the shaft into engagement with the clutch collar 34, which imparts rotation to the driving shaft and causes the follower with cutters to rise and fall, as will be evident.

The complete construction and operation of my machine will be readily understood from the foregoing description taken in connection with the accompanying drawings and the advantages which accrue from my improvements will be readily understood and appreciated and it will be noted that I provide a simple, strong, durable and cheap machine of small capacity which will rapidly cut and deliver the biscuits and which I have found to be particularly desirable and useful in making a two-layer biscuit, although I do not limit its use more than the claims are limited within the scope and spirit of the invention.

I claim:

1. A machine of the character and for the purpose described, consisting of a base, a platform above said base, a follower having a vertical movement with reference to said base and mounted between said base and platform, a motor and means operated thereby for raising and lowering said follower, said motor and said means being mounted on said platform, biscuit cutting means carried by said follower, means for receiving and containing the biscuits after being operated upon by the cutting means, means for controlling the vertical movement of said follower and cutting means, said controlling means comprising a clutch for throwing the driving mechanism into and out of operation, said clutch being manually operated and controlled and comprising a freely rotatable clutch collar, a sliding clutch collar, connections leading from said clutch collar, and a manually controlled hand lever for operating said clutch through said connections.

2. A machine of the character and for the purpose described, consisting of a base, vertical columns rising from said base, a mechanism supporting platform surmounting said columns, a driving shaft journalled above said platform, a motor for rotating said driving shaft, a manually controlled clutch for throwing said motor into and out of operation, said clutch comprising a freely rotatable clutch collar, a sliding clutch collar, a bell crank lever pivoted upon said platform and having one arm connected with said sliding clutch collar, a manually operated lever pivoted upon the base of the machine and connected with the other arm of said bell crank lever, a follower guided upon said columns, connections between said driving shaft and follower to impart a vertical movement to said follower, cutters carried by said follower, means for guiding and cleaning dough from said cutters, and means for receiving the biscuits after the operation of said cutters.

3. A machine of the character and for the purpose described, consisting of a base, a platform above said base, columns supporting said platform, a follower guided upon said columns, a driving shaft mounted above said platform, a pair of disks carried by said driving shaft, links connected with said follower and disks, a motor and means operated thereby for raising and lowering said follower, said motor and means being mounted on said platform, cutters carried by said follower, a spring cushioned cleaning plate mounted on said columns and through which said cutters pass, a dough supporting plate above the base of the machine having openings to receive said cutters and allow passage of the cut dough, a receiving pan on the base below said cleaning plate to receive the cut biscuits, and means for throwing the machine into and out of operative position, comprising a manually controlled clutch, consisting of a freely rotatable clutch collar, a sliding clutch collar, connections leading from said sliding clutch collar, and a manually operated hand lever pivoted on the base of the machine for operating said clutch through said connections.

In testimony whereof I affix my signature.

CARL BECKER.